June 12, 1945.  R. C. COBEL  2,378,355
GLASS RECEPTACLE
Filed Nov. 2, 1943

INVENTOR.
Ray C. Cobel.
BY Corbett, Mahoney & Miller

Patented June 12, 1945

2,378,355

UNITED STATES PATENT OFFICE 2,378,355

GLASS RECEPTACLE

Ray C. Cobel, Newark, Ohio, assignor to A. H. Heisey & Company, Newark, Ohio, a corporation of Ohio Application November 2, 1943, Serial No. 508,659

6 Claims. (Cl. 222—189)

This invention relates to glass receptacles. It has to do particularly, although not exclusively, with improvements in glass receptacles or containers such, for example, as cocktail shakers, or the like, for the reception, mixing and dispensing of iced beverages, as well as to receptacles or containers for the storage and dispensing of various liquids, such, for example, as wines, brandies, cordials or the like.

One of the objects of my invention is to provide an improved all-glass beverage receptacle, container or shaker.

Another object of my invention is to provide an improved glass storage and/or mixing receptacle for liquids having improved means permitting the contents thereof to be mixed or shaken and then poured or dispensed.

A further object of my invention is to provide an improved receptacle of the foregoing character which, by virtue of its improved structure and arrangement of parts, permits an even flow of the beverage from within the receptacle during the pouring or dispensing operation, while at the same time preventing the escape or discharge of ice therefrom, and also eliminating any possibility of the clogging or choking of the pouring or dispensing space or passageway.

Another object of my invention is to provide an improved receptacle of the foregoing character having a removable and adjustable glass stopper for sealing the receptacle, and one in which the body of the receptacle and the stopper therefor have cooperable means for permitting the contents of the receptacle to be discharged or poured therefrom.

A further object is to provide an improved receptacle of the foregoing nature in which the contacting surfaces of the body and the removable closure member or stopper therefor are so formed and arranged as to provide a tightly sealed receptacle, yet permitting the relative movement of the body and stopper to allow the contents of the receptacle to be poured or discharged therefrom when desired.

Generally speaking, my improved glass receptacle comprises a body portion provided with an opening in the upper end thereof, a pouring lip or spout associated with the opening, a removable glass stopper for closing and sealing the opening, and means formed in the stopper adapted to cooperate, by registry, with means formed in the body portion between the opening and pouring lip, to permit the contents of the receptacle to be poured or discharged therefrom when desired.

The foregoing and other objects and advantages of my invention will appear from the following description and appended claims when considered in conjunction with the accompanying drawing forming a part of this specification, wherein like reference characters designate corresponding parts in the several views.

Figure 1:
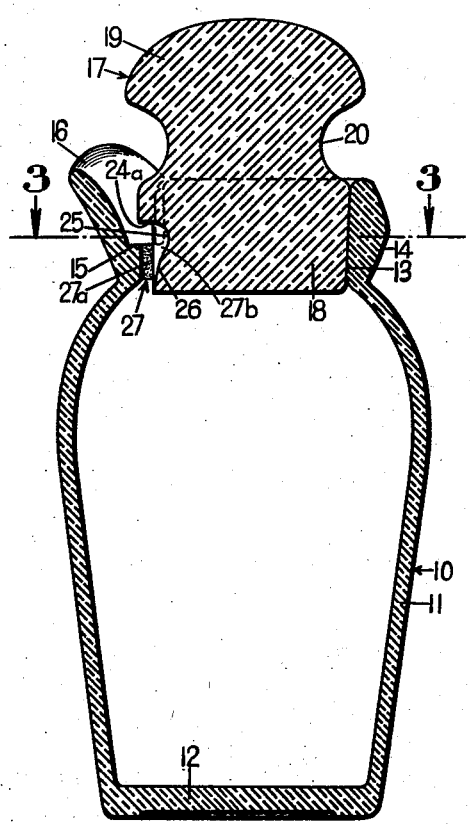
Figure 1 is a vertical sectional view through an improved receptacle embodying my invention, showing the stopper therefor in dispensing or pouring position.

Before explaining in detail the present invention it is to be understood that the invention is not limited in its application to the details of construction and arrangement of parts illustrated in the accompanying drawing, since the invention is capable of other embodiments and of being practiced and carried out in various ways. It is to be understood also that the phraseology and terminology employed herein is for the purpose of description and not of limitation, and it is not intended to limit the invention herein claimed beyond the requirements of the prior art.

Referring now particularly to the drawing wherein one embodiment of my improved receptacle, container or beverage shaker is shown, 10 represents, as a whole, the body portion of my improved receptacle, having side walls 11, a bottom wall or base 12 and, as shown, a circular or annular top opening 13 at the upper end portion of the body. The walls 11 terminate at their upper ends in a thickened neck portion 14 to provide a seat for the reception of a removable closure member or stopper to be presently described.

Figure 4:
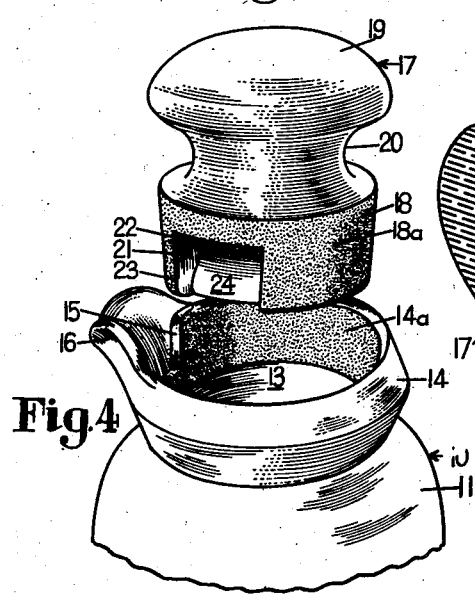
Figure 4 is a fragmentary perspective view of the receptacle of the preceding views showing the parts separated.

As best seen in Figure 4, the inner wall or face of the neck portion 14 is frosted and ground, as shown at 14a. The neck is also provided, as shown, with a substantially U-shaped notch or cut-out portion 15 and has formed thereon as an integral part thereof, a pouring lip or spout 16 which, in effect, provides an outer wall for the notch 15. The lip 16 merges with the neck portion 14 and provides an upward and outward projection thereon. The inner ground wall or surface 14a of the neck portion has an inward and downward taper to provide a substantially frusto-conical seat or socket for the reception of the stopper.

The opening 13 of the receptacle is preferably closed and sealed by a removable closure member or glass stopper, shown as a whole at 17. The stopper, as shown, has a base or bottom portion 18 and a top portion or knob-like upper end 19 providing a hand grip for handling and manipulating the stopper. The portions 18 and 19 are interconnected by an intermediate reduced portion 20, the three portions providing a one-piece integral glass stopper.

Figure 2:
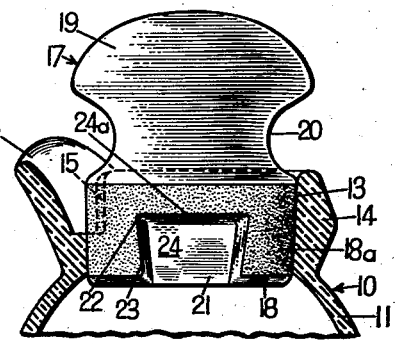
Figure 2 is a fragmentary vertical sectional sectional view, partly in elevation, of the receptacle shown in Figure 1, with the stopper in sealing or non-pouring position.

The base portion 18 of the stopper is, as shown, of substantially frusto-conical form, or downwardly tapered at an angle corresponding substantially to the inward and downward taper of the neck portion 14 of the receptacle. The outer wall or face of the stopper portion 18 is frosted and ground, as seen at 18a in Figures 2 and 4. This ground surface or face 18a and the similarly ground surface or face 14a of the neck together provide for an accurate fit at the joint between the stopper and receptacle neck when the parts are in their assembled relation as shown in Figure 2, to effectively seal the receptacle.

The base portion 18 of the stopper is, as shown, provided with a notch, cut-out portion or relieved area 21, the notch extending from substantially the upper edge of the stopper portion 18 to the bottom or under face or surface of the stopper. As shown, the notch or cut-out portion 21 is somewhat wider or longer at its upper end, as shown at 22, than at its lower or bottom end, as shown at 23, the end walls defining the notch having a gradual downward and inward taper toward one another, as clearly seen in Figure 2.

Figure 5:
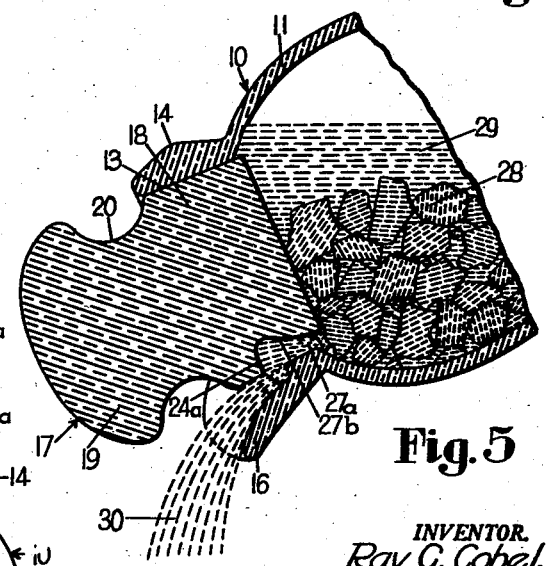
Figure 5 is a fragmentary longitudinal sectional view illustrating the act of pouring or dispensing the iced contents of the receptacle.

The back portion or inner wall defining the notch 21 and shown as a whole at 24, curved gradually upwardly and inwardly, as best seen in Figures 4 and 5 toward the upper defining wall or baffle 24a of the notch (Figure 5) so that the notch, at its upper end portion 25, is of somewhat greater depth than at its lower or bottom end portion 26, see especially Figure 4.

Figure 3:
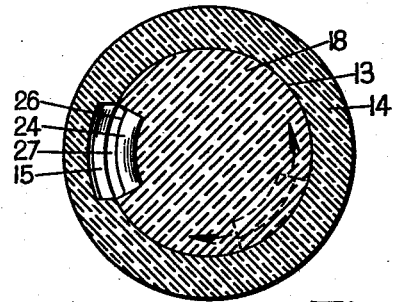
Figure 3 is a horizontal section view taken subtially along the line 3—3 of Figure 1, looking in the direction of the arrows.

The notch 15 in the neck 14 and the notch 21 in the stopper are adapted to be brought into registry, as shown in Figures 1, 3 and 5, when the stopper 17 is applied to the receptacle 10 to provide a pouring space or discharge passage or opening, such as the space 27 shown in these figures.

When the receptacle is to be used as a container and dispenser, such as a cocktail shaker for iced beverages, a quantity of pieces or cubes of ice, such as shown at 28 and liquid, such as shown at 29 (see Figure 5), are placed in the body of the receptacle, whereupon the stopper 17 is placed in position within the neck 14, with the notch or cut-out portion 21 out of registry with the notch 15 (see Figure 2) whereby to tightly seal the receptacle. The contents are now shaken and the beverage in the receptacle is ready to be served.

To permit dispensing or pouring of the beverage, indicated at 30 in Figure 5, the stopper 17 is turned or rotated from its closing and sealing position of Figure 2 to its beverage discharging or pouring position of Figures 1 and 5, by grasping the knob or grip portion 19 of the stopper and turning or twisting it within the neck 14 for a distance of approximately one quarter turn. This action will bring the notch 21 into a position opposite to and in registry with the notch 15 in the neck and permit the beverage 30 to be poured through the space or discharge passage or opening 27 provided between the neck and stopper by such positioning of the notches 21 and 15.

The particular shape and formation of the notches as described above, when in their cooperative relationship, will provide the space or passageway 27 whose inner or entrance end or throat is relatively restricted, as shown at 27a and which gradually increases in width to provide a somewhat wider space or enlargement at 27b in the region of the wall or baffle portion 24a and the base of the pouring lip 16, due to the formation or curvature of the back wall 24 defining one side of the notch 21.

The restricted entrance 27a of the space prevents the ice 28 from entering and clogging or choking the passageway. The widened portion 27b of said passageway and the wall or baffle 24a provide for an even flow of the beverage to the pouring lip during the pouring operation. Moreover, the space or passageway 27, as best shown in Figure 5, is of sufficient width to permit the passage therethrough of any relatively small or minute particles of ice which might enter the throat 27a of the space or passageway, thus eliminating any possibility of jamming or clogging of said passageway.

It will be understood, of course, that after a sufficient quantity of the beverage 30 has been poured, the stopper 17 may be turned or twisted relatively to the neck 14 to move the notch 21 away from the notch 15 and again close and seal the receptacle. Now, if desired, the receptacle may be again shaken without any danger of spilling of the beverage therein.

Having thus described my invention, what I claim is:

1. A cocktail shaker comprising a body formed from glass and having a neck portion provided with a notch, a pouring lip formed on said neck portion adjacent said notch, and a removable solid glass stopper having a portion adapted to frictionally engage and fit within the neck portion to seal the shaker, said stopper having a notch formed in a portion of its periphery and having a hand grip portion permitting the stopper to be turned in said neck portion to bring the notches into registry to provide a pouring space for the contents of the shaker, said pouring space being of gradually increasing depth from the body of the shaker toward the pouring lip thereof.

2. A glass receptacle comprising a body having an annular thickened neck portion at the upper end thereof, said neck portion having a notch formed therein, a pouring lip formed on said neck portion and cooperable with said notch, and a removable glass stopper having a base portion fitting within the neck portion to normally seal the receptacle, said stopper having a notch formed in the base portion thereof adapted to register with said first-named notch when the stopper is turned to a predetermined position to provide a pouring space for discharging the contents of the receptacle, said stopper notch being of gradually increasing depth from the base of the stopper whereby said pouring space is of gradually increasing size from the body of the shaker toward the pouring lip thereof.

3. A shaker according to claim 1 wherein the neck portion is relatively thicker than the body and pouring lip and wherein the contacting surfaces of the stopper and neck portion are frosted surfaces.

4. A glass receptacle according to claim 2 wherein the notch formed in said stopper has an upper defining wall providing a baffle to check the flow of the beverage through the pouring space.

5. A receptacle according to claim 2 wherein the notch formed in the base portion of said stopper is of gradually decreasing width and depth from the top to the bottom thereof.

6. A glass receptacle according to claim 2 wherein means is provided in the locality of the juncture of the neck portion and base of the pouring spout to check the flow of the beverage through the space provided by the registering notches.

RAY C. COBEL.